June 17, 1924.

J. PASCENTE

PERCOLATING TEA AND COFFEE POT

Filed March 6, 1924

1,498,288

Inventor
John Pascente

By [signature]
Attorney

Patented June 17, 1924.

1,498,288

UNITED STATES PATENT OFFICE.

JOHN PASCENTE, OF LONG ISLAND CITY, NEW YORK.

PERCOLATING TEA AND COFFEE POT.

Application filed March 6, 1924. Serial No. 697,220.

*To all whom it may concern:*

Be it known that I, JOHN PASCENTE, citizen of the United States, residing at Long Island City, in the county of Queens and State of New York, have invented certain new and useful Improvements in Percolating Tea and Coffee Pots, of which the following is a specification.

This invention relates to a coffee and tea pot of the type sometimes known as percolators, the invention having for an object the provision of a novel pot of this sort in which the leaves or grains are first subjected to the action of steam, during the heating of the water, and the latter then caused to drip by gravity through said leaves or grains.

For further comprehension of the invention, and of the objects and advantages thereof, reference will be had to the following description and accompanying drawing, and to the appended claims in which the various novel features of the invention are more particularly set forth.

Fig. 1 of the drawing is a vertical sectional view of my improved tea and coffee pot.

Figure 1:
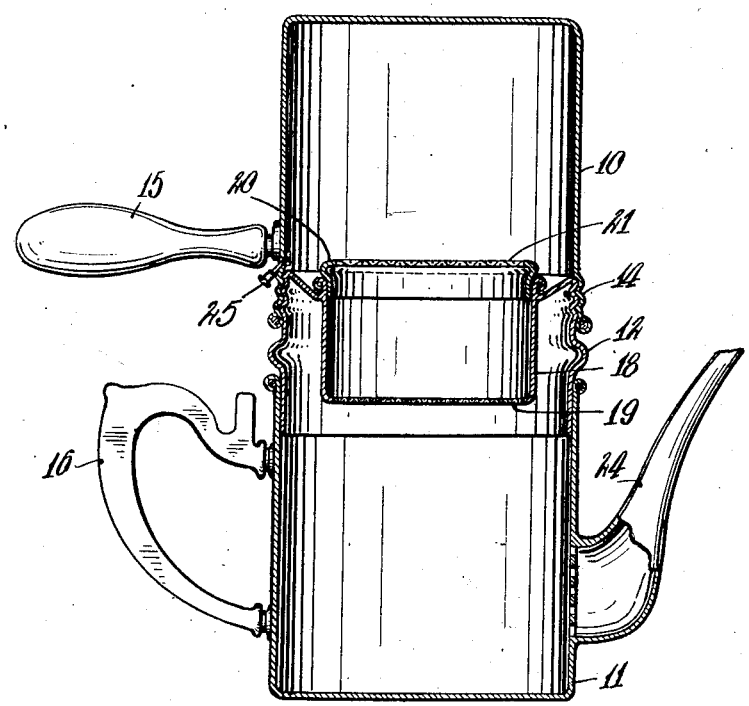

Referring now to the drawing my improved pot comprises two main receptacles 10 and 11 respectively, which are preferably of cylindrical shape, and of equal diameter one with the other. The receptacle 10 is adapted to receive the water for boiling, and the receptacle 11 to have the coffee drip thereinto. These receptacles have each one end open, and when the parts are assembled these open ends are turned toward one another, that is to say, one receptacle is inverted with respect to the other. The two open ends of the receptacles do not directly engage one another, but they engage opposite ends of an intermediate cylindrical element or sleeve 12 which is formed at one end with screwthreads adapted to engage with like screwthreads formed in the end of the receptacle, as indicated at 14. The opposite end of the sleeve is smooth and is adapted to fit freely into the open end of the receptacle 11. The two receptacles are formed with handles 15 and 16 respectively.

The sleeve 12 has mounted therein a cup 18 of smaller diameter than the sleeve and which has the bottom thereof in the form of a screen or strainer 19, the other end of the cup, which is the end turned toward the threaded end of the sleeve, is closed by a cap 20 in which is a screen 21 through which the water percolates, the area of opening through the screen 21 being greater than that through the screen 19. The cup 18 is adapted to receive the coffee grains.

In the use of my improved tea and coffee pot, the sleeve 12 is screwed into the receptacle 10 after the latter has been filled with water, and coffee grains have been placed in the cup 18, and then the receptacle 11 is placed over the projecting end of the sleeve. The device is then placed on a suitable heater with the bottom of the receptacle 10 in contact with the latter and the water heated to boiling point. The device is then inverted to the position shown in the drawing, and the water in the receptacle allowed to drip down through the coffee in the cup 18 to the receptacle 11, from which it is poured through the spout 24 with which said receptacle is provided. A one-way outlet valve 25 is provided adjacent the open end of the receptacle 10, while a like air-inlet valve may be provided adjacent the opposite end.

Figure 2:
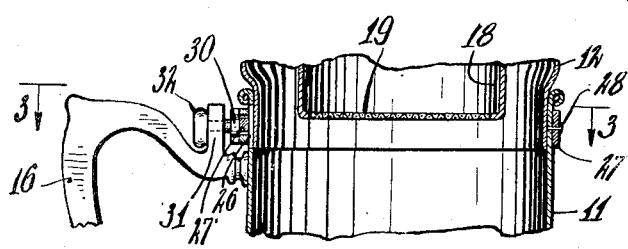
Fig. 2 is a fragmentary vertical sectional view showing a modified construction.
Figure 3:
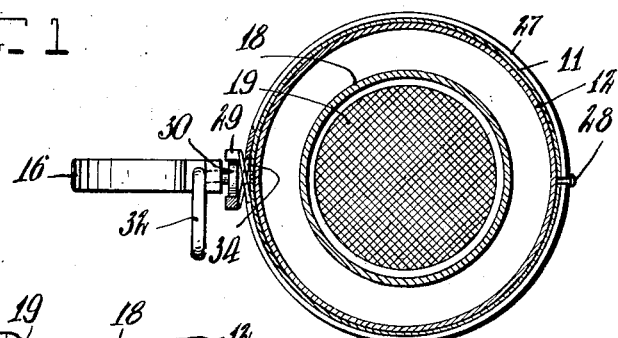
Fig. 3 is a horizontal sectional view taken on the line 3—3 of Fig. 2.

Since it is desirable to have the receptacle readily disengageable from the sleeve 12, while holding it against accidental displacement, I have shown in Fig. 2 the upper end of said receptacle with a vertical slot 26 and provide a contracting band 27 which is adapted to cause said upper end to grip the end of the sleeve, this band being here shown as riveted between its ends as at 28 to the front of the receptacle, and having its ends overlapping at the rear of the receptacle, these overlapping ends being provided with lateral projections 29 which are adapted to be engaged by a cam 30 fixed on the end of a spindle 31 rotatable in the handle 16 and having a thumbpiece 32 thereon by which it may be given a partial rotation. The ends of the band 27 may be conveniently overlapped by forming one end with a slot 34 and passing the reduced other end 27' of the band through said slot. By turning the cam 30 to bear on the lugs 29 the band will be constricted and cause the sleeve 12 to be gripped by the open end of the receptacle.

While I have illustrated and described a preferred embodiment of my invention it will be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:—

1. A device of the class described comprising a pair of receptacles having open ends, a sleeve engaged with the open ends of each receptacle, and a cup mounted in said sleeve, said sleeve having one end threaded and engaging complementary threads on one of the said receptacles, the other end of the sleeve smooth and fitting freely in the other receptacles, said cup having one end provided with a removable filter cap, said end of said cup being turned toward the screwthreaded end of the said sleeve.

2. A device of the class described comprising a pair of receptacles having open ends, a sleeve engaged with the open ends of each receptacle, and a cup mounted in said sleeve, said sleeve having one end threaded and engaging complementary threads on one of the said receptacles, the other end of the sleeve smooth and fitting freely in the other receptacles, and releasable means for clamping the end of the said other receptacle upon the said sleeve.

3. A device of the class described comprising a pair of receptacles having open ends, a sleeve engaged with the open ends of each receptacle, and a cup mounted in said sleeve, said sleeve having one end threaded and engaging complementary threads on one of the said receptacles, the other end of the sleeve smooth and fitting freely in the other receptacles, and releasable means for clamping the end of the said other receptacle upon the said sleeve, comprising a band attached between its ends to said other receptacle, and a cam member adapted to engage the ends of said band to constrict it upon the said other receptacle.

4. A device of the class described comprising a pair of receptacles having open ends, a sleeve engaged with the open ends of each receptacle, and a cup mounted in said sleeve, said sleeve having one end threaded and engaging complementary threads on one of the said receptacles, the other end of the sleeve smooth and fitting freely in the other receptacles, and releasable means for clamping the end of the said other receptacle upon the said sleeve, comprising a band surrounding said other receptacle with its ends overlaping and formed with lateral projections, and a rotary cam adapted to engage said projections to constrict said band.

In testimony whereof I have affixed my signature.

JOHN PASCENTE.